(12) United States Patent
Robell (10) Patent No.: US 7,918,960 B1
(45) Date of Patent: Apr. 5, 2011

(54) METHOD AND IMPROVEMENT TO SAW SYSTEM USED FOR CUTTING I-JOISTS TO SIZE

(76) Inventor: Glenn Robell, Fallbrook, CA (US)

( * ) Notice: Subject to any disclaimer, the term of this patent is extended or adjusted under 35 U.S.C. 154(b) by 1114 days.

(21) Appl. No.: 11/640,020

(22) Filed: Dec. 15, 2006

(51) Int. Cl.
- *B29C 65/00* (2006.01)
- *B29C 65/48* (2006.01)
- *B32B 37/00* (2006.01)
- *B32B 37/02* (2006.01)
- *B32B 37/12* (2006.01)
- *B32B 37/26* (2006.01)

(52) U.S. Cl. ........ 156/256; 156/250; 156/252; 156/253; 156/510; 156/516; 156/517; 156/523; 156/524

(58) Field of Classification Search .................. 156/250, 156/252, 253, 510, 523, 524, 256, 516, 517
See application file for complete search history.

(56) References Cited

U.S. PATENT DOCUMENTS

| | | | | |
|---|---|---|---|---|
| 5,676,187 A | * | 10/1997 | Owens et al. | 144/382 |
| 2006/0101785 A1 | * | 5/2006 | Wiercinski et al. | 52/793.1 |

OTHER PUBLICATIONS

"Boise Cascade's SawTek automated cutting system", Publication date: 2003.*

* cited by examiner

*Primary Examiner* — Mark A Osele
*Assistant Examiner* — Christopher C Caillouet
(74) *Attorney, Agent, or Firm* — Dorothy S. Morse

(57) ABSTRACT

A method and an improvement to saw systems configured to convert raw I-joists from inventory to pre-cut sizes and/or cut routed patterns in I-joists for utility pass-through applications prior to their shipment to a construction site or return to inventory, whereby a controlled amount of adhesive and a protective liner are automatically and successively applied to the top flange of each I-joist. The saw system improvement comprises coordinated mechanical, electrical, and pneumatic components.

20 Claims, 6 Drawing Sheets

Fig. 5

METHOD AND IMPROVEMENT TO SAW SYSTEM USED FOR CUTTING I-JOISTS TO SIZE

CROSS-REFERENCES TO RELATED APPLICATIONS

None

BACKGROUND

1. Field of the Invention

This invention relates to the field of saw systems used to cut I-Joists to size, specifically to a method and an improvement to saw systems, such as but not limited to the Sawtek saw system used by Boise Cascade that is configured to convert raw I-joists from inventory to pre-cut sizes and/or cut routed patterns in I-joists for utility pass-through applications prior to their shipment to a construction site, whereby the prior art saw system is enhanced by the addition of equipment configured for applying a controlled amount of adhesive and a protective liner automatically and successively to the top flange of each I-joist, and wherein such application preferably takes place before the I-joists are cut. The present invention preferably comprises coordinated mechanical, electrical, and pneumatic components to achieve the adhesive and protective liner applications.

2. Description of the Related Art

In today's construction, most local building codes require adhesive bonding in floor construction, which has led to the common practice of manually applying liquid adhesives on site. However, there are at least two important disadvantages to the on-site manual application of liquid adhesives during floor construction. One such disadvantage is that it is labor intensive and can significantly increase construction cost. The second such disadvantage is that there is the potential for inconsistent application, whereby, if too little adhesive is used, maximum sheer and strength in the finished construction project is not achieved. In the alternative, if too much adhesive is applied, material cost is unnecessarily increased. In addition, weather conditions also can adversely affect the bonding of adhesives applied on site by interfering with its application or curing, or both. To overcome these disadvantages, the present invention comprises a method and equipment for improving the saw systems used for cutting and/or routing raw I-joists prior to their shipment to a construction site or return to inventory. It has many advantages over the prior art method of on-the-job manual adhesive application now in use. One of the main advantages of automated adhesive application using the present invention is that it is manufactured in a controlled environment that achieves a more consistent and stronger bond of the adhesive layer to the I-joist than can be achieved with on-the-job adhesive applications. The controlled manufacturing environment for the present invention also creates a good bond between the release liner and the protected adhesive layer beneath it so that the release liner is not easily dislodged by casual contact prior to I-joist installation on a construction jobsite, allowing the adhesive to remain in its optimum condition for easy, rapid, strongly bonded, and secure I-joist installation. Also, as a result of the controlled manufacturing environment at the time the release liner is applied over the present invention adhesive layer, the adhesive layer stays covered and dry prior to I-joist installation, whereby I-joist installation during adverse weather conditions does not interfere with or diminish the bonding capability of the pre-applied adhesive. Further, as no curing time is required for the present invention adhesive layer after on-site I-joist installation, its bonding is prompt and immediately strong. Another advantage of the present invention is that the protective release liner over the adhesive layer is configured and positioned to prevent adhesive degradation prior to I-joist installation, either from casual contact with other objects during transport and handling that could lead to the removal of indiscriminate portions of the adhesive layer via nicking or gouging, as well as various potentially degrading contact of the adhesive layer with airborne particles, other debris, moisture, and direct solar radiation during the transport of the I-joists enhanced with the present invention, their storage, and/or while they are present on a construction site waiting for installation. Further, the cost of the automated application of the present invention adhesive layer and protective release liner to I-joists prior to their delivery to a construction jobsite is very low when compared to the on-site labor cost needed to achieve the enhanced strength in a finished floor that is mandated by most local codes. A further advantage of the low cost present invention' in areas subject to severe weather conditions, such as but not limited to areas frequently experiencing hurricanes, typhoons, and tornados, the present invention can provide a means for strengthening the connection between I-joists and adjacent sheer panels in roof construction for a very low material and labor cost when compared to on-site manual adhesive application, which is not currently required by building codes or routinely done in today's residential and commercial construction. No method or improvement to I-joist cutting saw systems is known that provides the valued-enhanced product or other advantages of the present invention.

BRIEF SUMMARY OF THE INVENTION

The primary object of this invention to provide a method and improvement to saw systems used to cut raw I-joists prior to their delivery to a construction jobsite, whereby I-joists are enhanced by the automated application of an adhesive layer and a protective liner configured and dimensioned to achieve a stronger and more consistent bond between the I-joists and adjacent sheer panels commonly used in today's residential and commercial construction industry. Another object of this invention is to provide a method and improvement to saw systems used to cut raw I-joists prior to their delivery to a construction jobsite that produces adhesive-enhanced I-joists that meet local building codes for floor construction which require the use of adhesives, and does so with a very low cost when compared to the labor cost of manual adhesive application. It is a further object of this invention to provide a method and improvement to saw systems used to cut raw I-joists prior to their delivery to a construction jobsite that produces adhesive-enhanced I-joists that promptly bond with adjacent sheer panels, achieve a more consistent bond between I-joists and adjacent sheer panels in finished construction than manually applied adhesives, and are not compromised by I-joist installation during inclement weather.

The present invention method and saw system improvement, when properly implemented, will provide I-joists enhanced with an adhesive layer and a protective liner that are able to achieve a more consistent bond with adjacent sheer panels to achieve maximum overall strength in finished construction for a very low cost when compared to the cost of on-site manual adhesive application. Such enhanced I-joists can be used in various parts of a building under construction, such as but not limited to floors, walls, decks, and/or roofs. It is contemplated for the adhesive layer and overlaying protective liner to be applied to at least one side of an I-joist flange by coordinated mechanical, electrical, and pneumatic components added to a saw system that convert raw I-joists from inventory to pre-cut sizes prior to shipment to a construction site or return to inventory, and/or a saw system that cuts routed patterns in I-joists for utility pass-through applications. Preferably, the present invention controller first accepts the cut patterns from the associated saw system controller. The associated saw system drive mechanism then begins transfer of the raw I-joist across the present invention improvement. In the alternative the present invention improvement can include an I-joist drive. An air-activated side pressure wheel in the present invention then pushes the I-joist to be enhanced against the opposing straight edge of the saw system's in-feed table assembly. Preferably, a low friction backing material is incorporated into or applied to the opposing straight edge, and/or one or more guide wheels are employed to reduce friction created by contact of the I-joist against the opposing straight edge. At least one present invention adhesive/glue head then extrudes glue/adhesive onto the exposed (top) edge of the I-joist. Once the glue/adhesive is applied, a present invention liner applicator then places a protective liner upon the applied adhesive. A present invention applicator roller bearing and a pressure roller bearing then press the adhesive and the protective liner to the mil thickness desired for the adhesive, after which the present invention liner applicator cuts the protective liner at pre-determined points according to the cut pattern instructions received from the saw system's controller. If needed, a cooler can be used to cool the glue/adhesive before the application of the release liner. An angled wheel in the present invention improvement then holds the enhanced I-joist in a fixed orientation so as to guide the I-joist to the saw system's routing and/or cutting stations and for optimum and expedient travel through the out-feed assembly of the present invention. In the alternative, the present invention improvement can be positioned after the saw system's routing and/or cutting stations, or between them if they are separate. It is contemplated for the combined saw system and present invention improvement to be located in an area where both are readily accessible for inspection, routine maintenance, and repair. The saw system used with the present invention improvement typically exceeds 130 feet in length and maintains a working height of approximately three feet, and further has a controller, a saw and/or router, an inkjet system for applying markings to the flange end web, an in-feed table assembly, an out-feed table assembly, an air compressor, and a dust collector.

BRIEF DESCRIPTION OF THE DRAWINGS

FIG. 6 is an enlarged top view of the adhesive layer and release liner application system in the most preferred embodiment of the present invention.

DETAILED DESCRIPTION OF PREFERRED EMBODIMENTS

Figure 3:
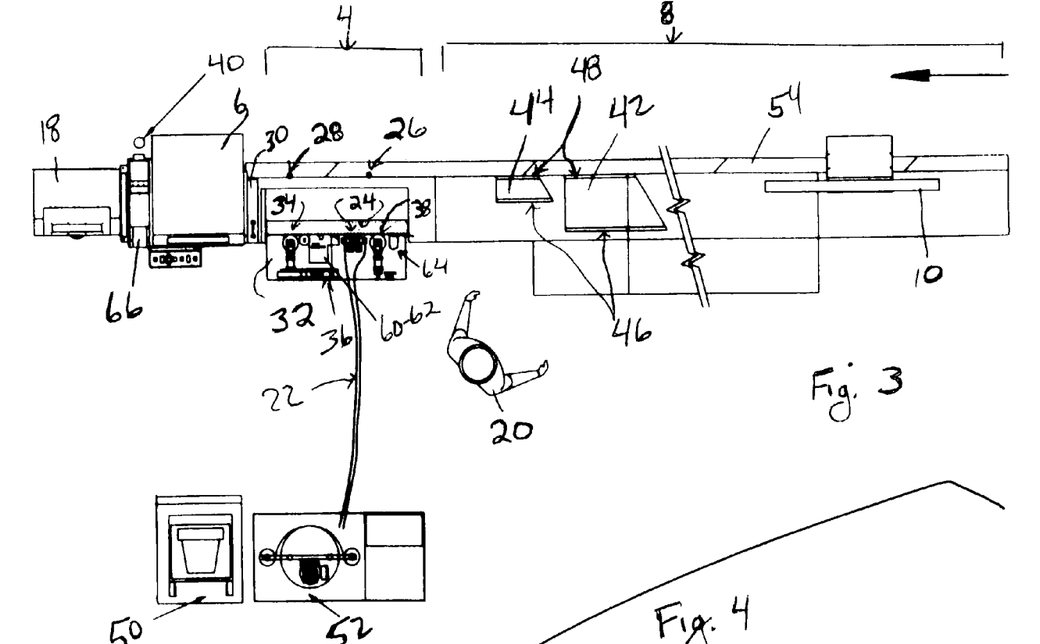
FIG. 3 is a top view of the saw system in FIG. 1 having a remotely located drum melter and saw system CPU station.
Figure 7:
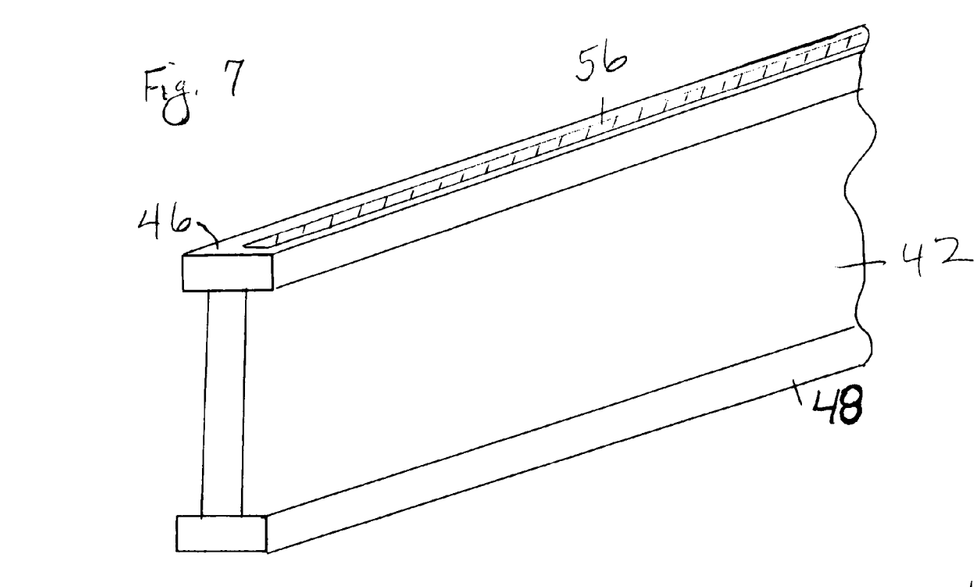
FIG. 7 is a perspective view of a protective cover applied by the present invention across the top end of an I-joist.

The present invention provides value-added construction materials and a method that achieves a more consistent bond between structural framing components, such as but not limited to smaller I-joist 44 and larger I-joist 42 in FIG. 3, and adjacent sheer panels (not shown) to achieve maximum overall strength in finished construction. Typically in the present invention, but not limited thereto, framing components, such as roof trusses, floor trusses, floor and ceiling joists, walls studs, roof and wall sheathing, and floor panels, will have adhesive (shown in FIG. 8 by the number 58) applied during manufacture to at least one surface, with the adhesive being configured and dimensioned to meet up with the intended contact area of the opposing component to which it will be joined after adhesive 58 has been pressed into its final thickness dimension. For example, but not limited thereto, in today's construction when roof trusses are laid out two foot on center, there is no adhesive between each truss and the sheathing above it, and thus no strength is provided in such a bond other than that which is derived via the nails or other fasteners used. When product made by the present invention is used (such as that shown in FIGS. 7 and 8), the bonding provided by its adhesive 58 enhances the overall strength of the roof in which it is used to protect roof integrity against strong winds and other harsh weather conditions. This bond can be provided by adhesive 58 applied during manufacture to the truss, the sheathing above it, or both. Similar application is anticipated for floor construction, wall construction, deck construction, and the construction of other areas needing added strength for enduring use. The present invention adhesive 58 can also completely cover a surface, or be applied to the construction materials in strips, such as two foot on center. When it completely covers the surface of a panel, the additional pre-applied adhesive of the present invention not in direct contact with an adjacent structural framing component can be used for interim or permanent bonding of vapor barriers and insulating materials. It is contemplated for the type of adhesive/glue used in the present invention to be unaffected by and/or protected from inclement weather so that a uniform and consistent bond is always achieved between adjacent framing components, even when installation occurs during adverse/inclement weather conditions that would otherwise cause construction delay. It is also contemplated for the product made according to the present invention to be used in all areas of a building, not just its floors, although it may be limited to one part of a structure that according to the intended application is in particular need of added strength. A covering, protective liner (such as liner 56 in FIGS. 7 and 8), or removable film is used over the adhesive 58 for pre-installation protection of adhesive 58, with the intent that the covering/liner/film be removed immediately prior to enhanced framing component use. If the adhesive 58 used as a part of the present invention enhanced framing component is thickly applied during manufacture, the adhesive 58 would also provide a noise buffer in the finished structure, particularly when present invention enhanced framing components are used throughout the structure in its roof and walls, as well as its floor systems. FIG. 7 shows a perspective view section of I-joist 42 having opposed flanges 46 and 48, with a release liner secured to flange 46 over an adhesive layer 58 that is hidden from view. In contrast, FIG. 8 shows an enlarged side view of the same flange 46 of I-joist 42 having an adhesive layer 58 in contact with flange 46 and a release liner 56 above adhesive layer 58 in a protective position over it.

Figure 1:
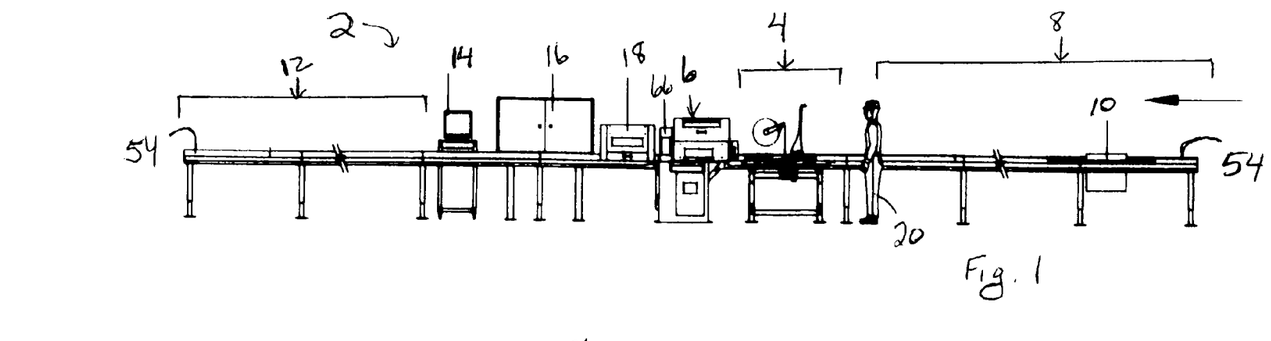
FIG. 1 is a side view of a saw system that includes the most preferred embodiment of the present invention improvement.
Figure 2:
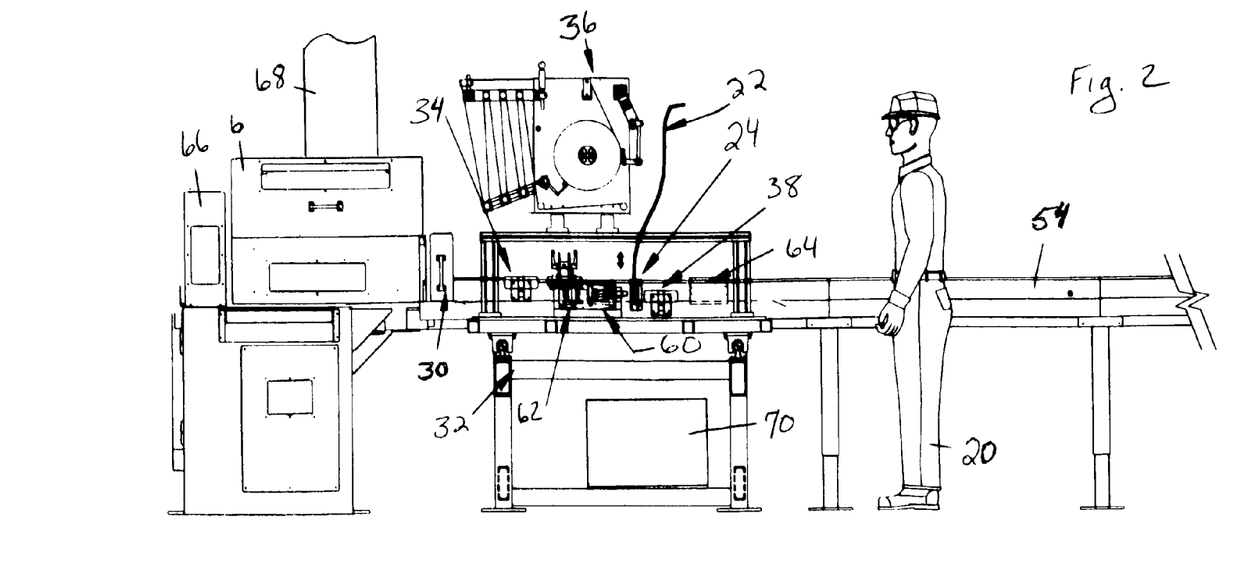
FIG. 2 is an enlarged side view of saw system in FIG. 1 having a support table, a straight edge, an angled wheel to maintain the opposed end of an I-joist against the straight edge, a liner applicator, at least one glue head, and an alignment/pressure wheel.
Figure 4:
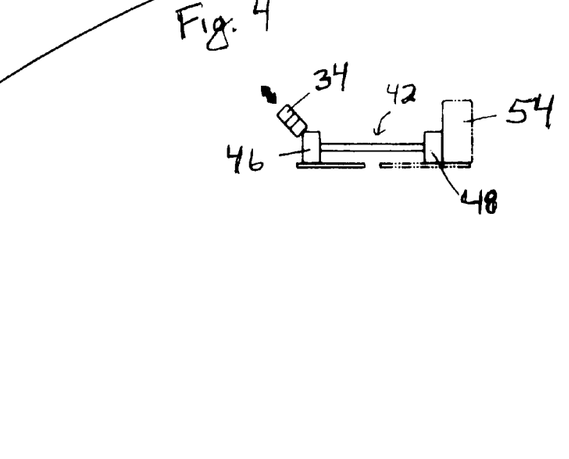
FIG. 4 is an enlarged front view of the angled wheel used in the most preferred embodiment of the present invention used to maintain the opposed end of the I-joist against the straight edge of the saw system.
Figure 5:
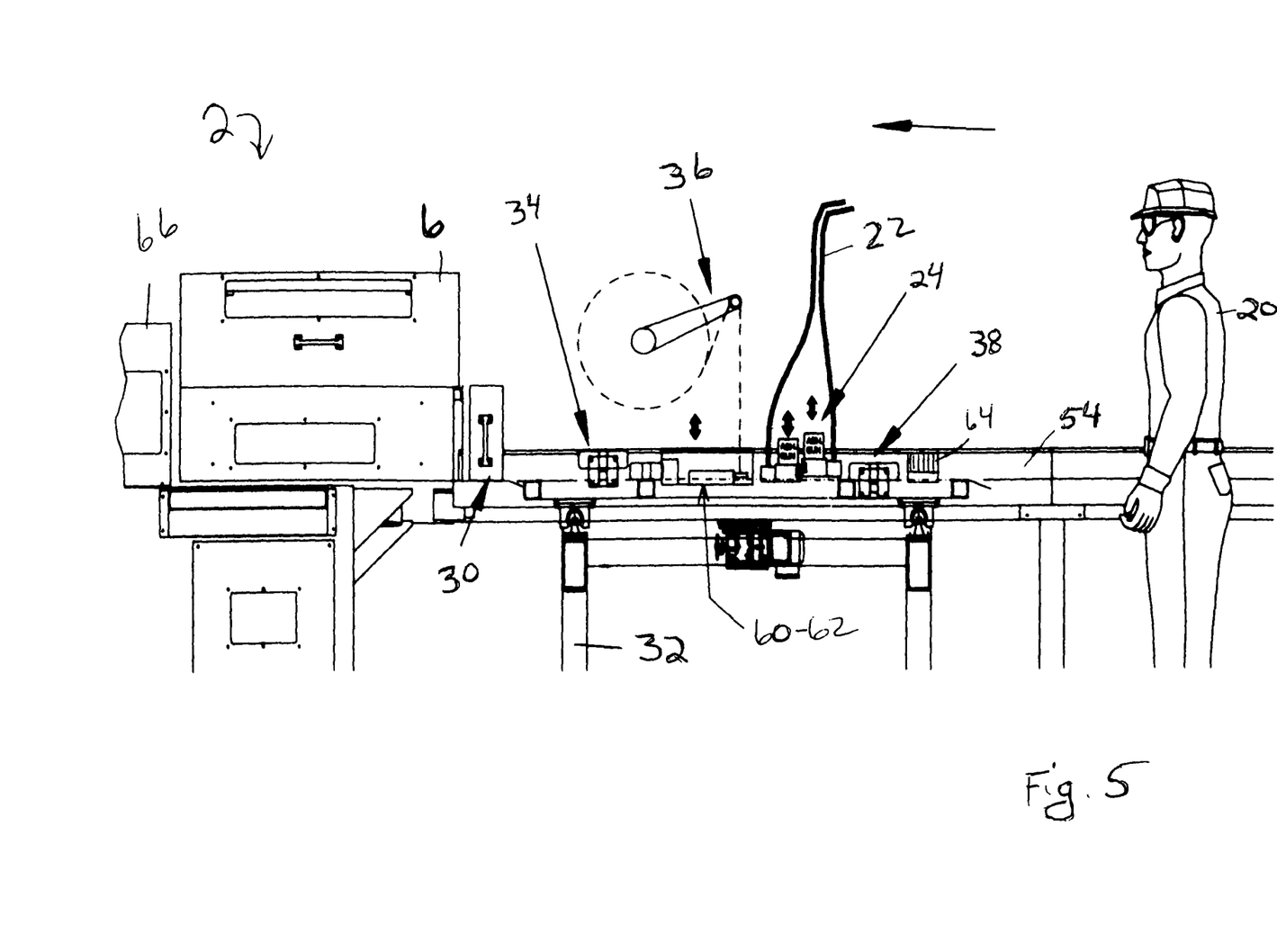
FIG. 5 is a further enlarged side view of combined saw system and present invention improvement in FIG. 1 that provides additional visual detail about present invention components.
Figure 8:
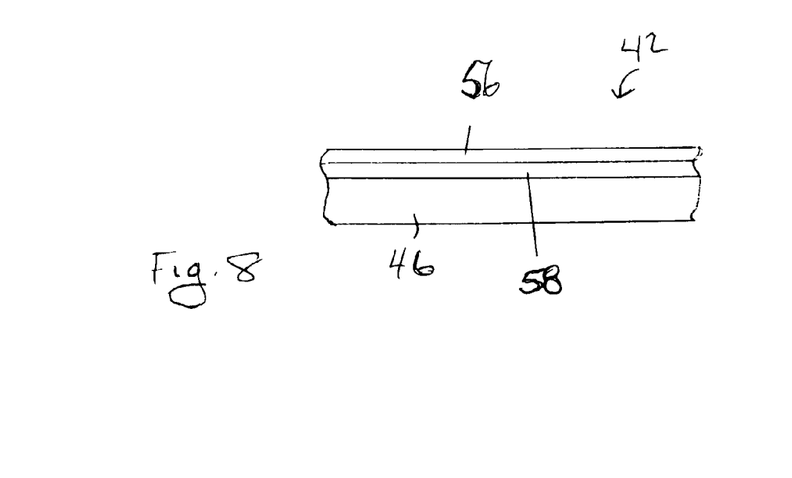
FIG. 8 is a not-to-scale side view of an I-joist with an adhesive layer and protective cover applied by the present invention.
Figure 9:
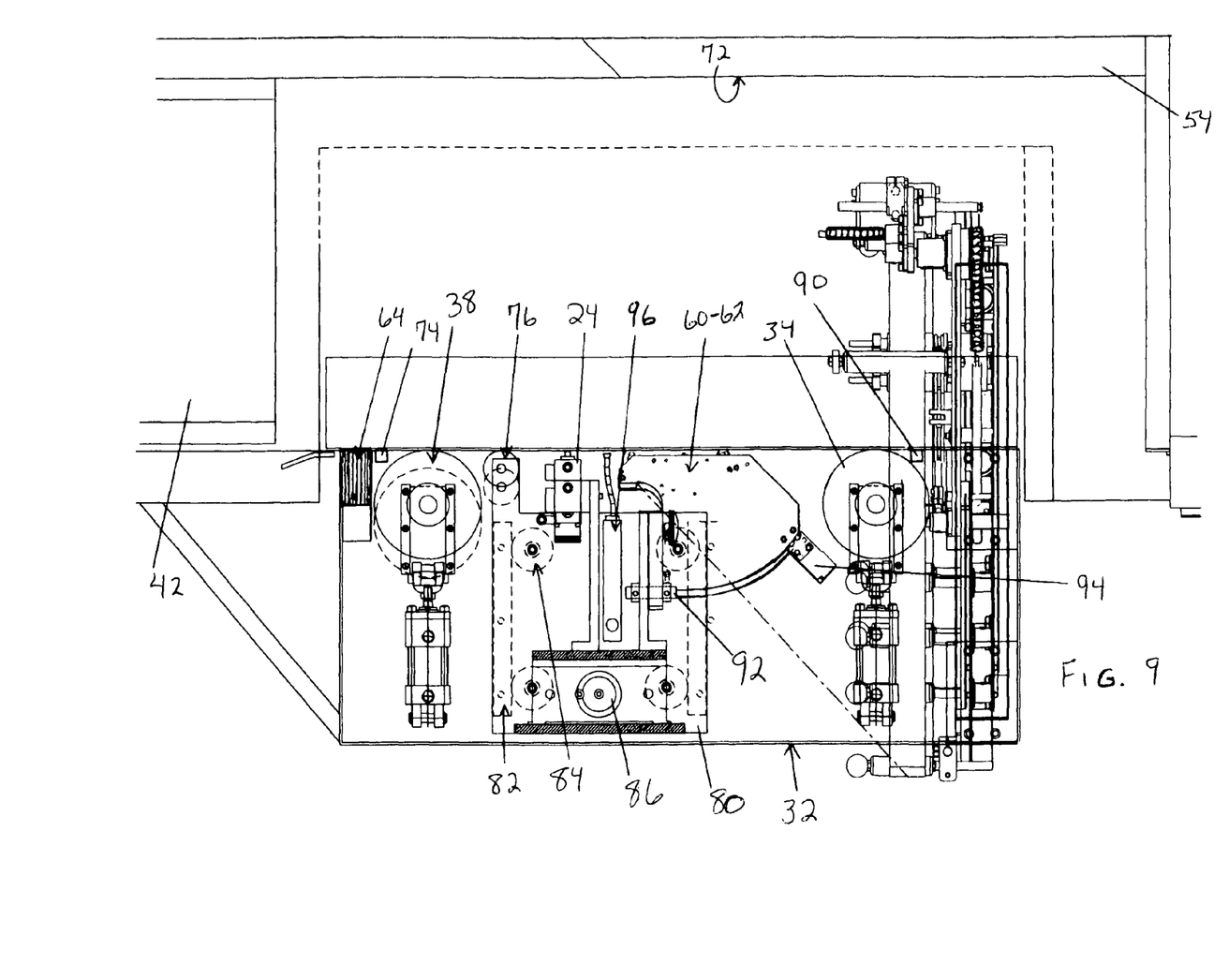
FIG. 9 is an enlarged top view of the most preferred embodiment of the present invention with alternative positioning of the release liner unwinder, low friction backing material secured to the opposing straight edge in place of guide wheel/roller bearings, a cooler, and I-joist sensors.

FIGS. 1-6 and 9 show the most preferred embodiment of the present invention improvement 4 to a saw system 2 which allows the addition of adhesive layer 58 and a protective liner 56 to the flange 46 of various sizes of I-joist (such as but not limited to those shown by the numbers 42 and 44), while FIGS. 7 and 8 show an example of a product made by the present invention. As shown in FIG. 3, a drum melter 52 and CPU station/controller 50 for saw system 2 are typically located remotely from the present invention support table 32 over which the I-joists 42, 44, or other travel for cutting/routing, as well as adhesive layer 58 and protective release liner 56 application. When needed, a cooler (such as but not limited to the cooler shown by the number 96 in FIG. 9) can be used to lower the temperature of glue/adhesive 58 before release liner 56 is applied. FIG. 1 is a side view of an entire saw system 2 with in-feed table assembly 8 and out-feed table assembly 12, incorporating the most preferred embodiment of the present invention 4 therebetween for the addition of an adhesive layer 58 and a protective liner 56 to an I-joist 42 or 44. Unless otherwise specifically excluded herein, it should be understood that any use of the designation I-joist 42 or 44 is not limited to the size and configuration of the I-joists 42 and 44 shown in FIG. 3. FIGS. 2 and 5 are enlarged side views of a portion of the saw system 2 shown in FIG. 1, with the present invention 4 having a support table 32, an angled wheel 34 adapted to maintain the opposed end of the I-joist 42 or 44 against the straight edge 54 of saw system 2, a liner unwinder 36, liner applicator/cutter means 60-62, at least one glue head 24, and an alignment/pressure wheel 38. Means to permit smoother transfer of an I-joist 42 or 44 across support table 32 during adhesive layer 58 application is also desired, which preferably comprises a low friction backing material (such as but not limited to that shown in FIG. 9 by the number 72), one or more guide wheel/roller bearings (such as but not limited to that shown in FIGS. 3 and 6 by the numbers 26 and 28), or a combination of the two. FIGS. 2 and 6 are top views of the most preferred embodiment of the present invention improvement 4. As shown by the horizontally-extending left-pointed arrow in FIGS. 1-3 and 5-6, the travel direction of I-joists 42 or 44 over saw system 2 is from right to left, although repositioning of components could also allow for left to right I-joist 42 or 44 travel. In addition, FIG. 3 shows the in-feed assembly 8 and present invention improvement 4 with the CPU station/controller 50 of saw system 2 being remotely positioned from the saw/router cabinet 6, with the drum melter 52 for supplying adhesives 58 to glue heads 24 being remotely located from saw/router cabinet 6. Although shown together in FIG. 3, it is not critical for CPU station/controller 50 and drum melter 52 to be positioned adjacent to one another. FIGS. 4 and 9 shows an enlarged view of the angled wheel 34 used in the most preferred embodiment of the present invention 4 to maintain the opposed end of the I-joist 42 or 44 against the straight edge 54 of saw system 2. Further, FIG. 9 is an enlarged top view of the most preferred embodiment of the present invention with alternative positioning of the release liner unwinder 36 and the use of low friction backing material 72 upon the entire face of straight edge 54 in place of guide wheel/roller bearings 26 and 28.

The present invention improvement 4 is preferably integrated into a saw system 2 between its in-feed table assembly 8 and its sawing and routing station/cabinet 6. However, although not shown, it is also contemplated for present invention 4 to be positioned between sawing and routing station/cabinet 6 and the out-feed table assembly 12, or between sawing and routing equipment if not positioned in a combined sawing and routing station/cabinet 6, as indicated in FIG. 2. Typically, the raw I-joist product 42, 44, or other that needs to be cut to size and/or routed for a special purpose, is transferred through the present invention 4 by the saw system 2 drive. If the saw system 2 used with the present invention 4 does not have drive means, although not shown, it is contemplated that the present invention would include one. In either case, it is preferred for the drive means used to be controlled by electric or hydraulic power. The orientation of I-joist 42 or 44 for transfer along the saw system 2 in-feed table assembly 8, sawing and routing station/cabinet 6, and the present invention improvement 4, is such that the opposed bottom flange 48 of the I-joist 42 or 44 not targeted for adhesive 58 and release liner 56 application is positioned against the straight edge 54 of saw system 2, while the top flange 46 of the I-joist 42 or 44 targeted for enhancement is in a position remote from the straight edge 54 of saw system 2. Two important purposes are served by this arrangement. The specified I-joist 42 or 44 orientation permits the operator 20 to visually observe the application of adhesive 58 in progress. Also, the protective release liner 56 will not be in a position to rub against the straight edge 54 of the out-feed table assembly 12 while transferring across the portion of saw system 2 beyond sawing and routing station/cabinet 6. Rubbing on straight edge 54 could scratch the finish of protective liner 56 and degrade the quality of any ink jet markings applied thereto by printer 18. Before running the I-joist 42 or 44 product through the combined saw system 2 and present invention improvement 4, the present invention 4 will be adjusted according to the height and flange width of the I-joist 42 or 44 targeted for adhesive 58 and release liner 56 application. Such adjustment in present invention 4 can be via manual means, by automated operation, or both.

As shown in FIGS. 1-3, the present invention improvement 4 to a saw system (such as but not limited to the saw system 2 in FIG. 1) is supported by a floor-mounted base frame in the form of a support table 32, preferably made from steel and capable of adjusting to the height of I-joists, including but not limited to the I-joists 42 and 44 shown in FIG. 3. Support table 32 includes a top surface configured for guiding the I-joist 42, 44, or other from the in-feed table assembly 8 of saw system 2, across present invention 4, and on to the sawing and routing station/cabinet 6 of saw system 2. FIG. 2 also shows a dust collector 68 in association with sawing and routing station/cabinet 6. The saw blade that cuts I-joists 42 or 44 to length is located adjacent to sawing and routing station/cabinet 6 and shown in FIGS. 1-3 and 5 by the number 66. The present invention improvement 4 includes but is not limited to a top flange face guide/pressure wheel 38, a length of low friction backing material (identified in FIG. 9 by the number 72) and/or series of straight edge guide wheels or roller bearings (identified by the numbers 26 and 28 in FIGS. 3 and 6), a cleaning brush assembly 64, at least one adhesive application head 24 (also identified herein as glue head 24) connected via glue hoses 22 to a drum melter 52 with pump and controls, a liner unwinder 36, a liner applicator 60, at least one liner cutter 62, and an adhesive system controller 70, which is preferably located under and attached to main support table 32. Mechanical components include a top flange face guide wheel 38 that is configured to push the I-joist 42, 44, or other to be enhanced against the straight edge 54 of saw system 2. Pneumatic operation is contemplated for the opening and closing of guide wheel 38 to accommodate the size of I-joist targeted for enhancement (42, 44 or other). A low friction backing material 72 and/or a series of guide wheels or roller bearings (such as but not limited to guide wheels or roller bearings 26 and 28 shown in FIGS. 3 and 6), are integrated into the straight edge 54 that is in an opposed position to the top face guide wheel 38, whereby they to reduce friction and torque requirements of the saw system 2 drive and thereby permit smoother transfer of the I-joists, such as 42 and 44, through the present invention improvement 4. Low friction backing material 72 may comprise ultra high molecular weight (UHMW) polyethylene, but is not limited thereto. The brush assembly 64 sweeps the surface of the I-joist 42 or 44 free of dust immediately prior to the application of adhesive 58. Preferred glue application components include a bulk hot melt tank 52 (also referred to herein as melter 52) with integral temperature controller, a variable speed-controlled pump (not separately identified with a number in the illustrations), at least one heated glue hose 22, and at least one glue head assembly 24. Each glue head 24 is independently adjustable according to I-joist 42 or 44 height and flange width. Further, each glue head 24 extrudes adhesive 58 at desired intervals according to patterns cut in response to the instructions given by the CPU station/controller 50 of saw system 2. When needed, a cooler 96 can be used between glue head 24 and liner applicator 60 to lower the temperature of adhesive 58 before liner 56 is placed over adhesive 58.

The present invention further has protective release liner 56 application components that include a liner unwinder 36, as well as a liner applicator 60 with integral liner cutter 62. As shown in FIGS. 6 and 9, liner unwinder 36 is positioned above support table 32 and may be in varying positions and orientations relative to support table 32. Preferably, the cutting knife or blade in liner cutter 62 is located at a distance of less than one inch from the positioning of liner applicator 60. The liner unwinder 36 can be powered or non-powered, and maintains even tension according to variable saw system 2 speeds. The liner applicator 60 covers the already applied adhesive 58 on the top of the I-joist 42 or 44 with an easily-releasable protective liner 56, and includes an integral applicator roll and an integral post pressure roll (not separately shown) that together form and maintain the desired mil thickness of adhesive 58 on the targeted top end of I-joist 42 or 44. Pressure may be applied either mechanically or pneumatically. The liner cutter 62 severs the protective liner 56 at desired intervals according to the I-Joist 42 or 44 cut patterns determined by saw system 2. Although not critical, it is preferred that the controller 70 in the most preferred embodiment of the present invention 4 have web-based support so that diagnosis and troubleshooting can be performed over an Internet connection. Further, it is contemplated that the most preferred controller 70 of the present invention improvement 4 will provide position verification for its components, it will accept signals from the CPU station/controller 50 of saw system 2 that provide I-joist 42 or 44 dimensions and cut patterns, and it will control the liner unwind, application, and cutting equipment 36, 60, and 62. In addition, although not shown, it is contemplated for the most preferred controller of the present invention to have sensor and push button panel inputs; have mechanical, pneumatic, and alarming outputs; integrate the adhesive control system; monitor I-joist travel speed, and provide a signal for variable control of the adhesive pump associated with glue melter 52. FIG. 9 also shows a floating sub-base 80 that preferably supports a guide wheel 76, glue head or heads 24, liner applicator/cutter 60-62, and an adjustable base 78. Sub-base 80 is guided by precision V-wheels 82 and V-rail 84. The in and out motion of sub-base 80 is by air cylinder (not shown). Adjustable base 78 is adjusted manually to go up and down by a hand wheel 86 to position the components supported by sub-base 80 according to the flange width of the I-joist 42, 44, or other receiving adhesive/glue 58 and a protective liner 56 during travel across support table 32. In addition, it is contemplated for liner applicator 60 to have a configuration and positioning that allows temporary rotation ninety degrees to simplify the threading of liner applicator 60 and for maintenance work. The position of liner applicator 60 is secured by a hand knob 94. The pivot point for liner applicator 60 is shown by the number 92. FIG. 9 also shows a leading edge control sensor 74 that detects the lead edge of an I-joist 42, 44, or other, which sends a signal to controller 70, which then causes pressure wheel 38 to extend an I-joist 42, 44, or other against straight edge 54. Upon command from controller 70, sub-base 80 also extends toward I-joist 42, 44, or other, and makes contact with the top surface of the adjacent flange 46 of I-joist 42, 44, or other. Sub-base 80 will remain under air pressure to keep sub-base guide wheel 76 against I-joist 42, 44, or other. Guide wheel 76 and the floating capability of sub-base 80 will maintain a pre-determined desired distance between top surface 46 and glue head or heads 24, as well as between top surface 46 and liner applicator/cutter 60-62, so as to achieve consistent adhesive application. FIG. 9 also shows a trailing edge sensor 90 that instructs controller 70 that there is no longer an I-joist 42, 44, or other moving across support table 32, whereby controller 70 then releases pressure wheel 38, sub-base 80, and angle wheel 34 so that they move away from straight edge 54 to an outermost position ready for the in-feed of another I-joist 42, 44, or other.

During its operation, the most preferred embodiment of the present invention 4 undergoes the following sequence of events. The controller 70 of the present invention 4 first accepts the cut patterns from the CPU station/controller 50 of saw system 2. The trolley track drive assembly (designated by the number 10 in FIG. 1) of saw system 2 then begins transfer of the raw I-joist 42 or 44 across present invention improvement 4. Although not shown, in the alternative the present invention 4 can include a drive for I-joist 42 or 44 travel during adhesive 58 and release liner 56 application. Upon instruction from controller 70, the side pressure wheel 38 then pneumatically activates to push the I-joist 42 or 44 against the opposing straight edge 54 associated with the trolley track drive assembly 10. Guide wheel 38 serves two functions. First, it protects the downstream equipment from damage in the event an I-joist 42 or 44 is bowed away from straight edge 54 and thus would strike the adhesive application equipment. Second, it also maintains the desired gap between the I-joist 42 or 44 surface receiving the adhesive 58 and the release liner 56. If the I-joist 42 or 44 surface were to bow out toward the orifices of the glue head 24, the adhesive pattern would be adversely affected. Because guide wheel 38 forces the I-joist 42 or 44 against straight edge 54, friction is produced that can adversely affect the performance of the Sawtek drive mechanism (an AC Servo controlled "Trolley"). Low friction backing material 72 and/or roller 26 opposes guide wheel 38 in order to reduce friction at the straight edge 54 across from guide wheel 38. Low friction backing material 72 and/or roller 28 serves the same function only it is located opposite of angled wheel 34. The glue head or heads 24 then extrude glue/adhesive 58 onto the targeted top edge 46 of the I-joist 42 or 44 according to saw system 2 speed. The liner applicator 60 then places the protective release liner 56 on top of the already applied adhesive 58 on the top edge 46 of I-joist 42 or 44. The applicator roll and post pressure roll integral to liner applicator 60, and not separately shown, press the adhesive 58 and the protective liner 56 to the desired mil thickness of adhesive 58 that is dictated by the construction application in which it will be used. Further, the liner cutter 62 cuts the protective liner 56 at pre-determined points according to the cut pattern instructions received from the CPU station/controller 50 of saw system 2. Angled wheel 34 holds the I-joist 42 or 44 against the straight edge 54 as it leaves present invention improvement 4 and travels toward the saw/routing station/cabinet 6, after which controller 70 releases pressure wheel 38, sub-base 80, and angle wheel 34 so that they move away from straight edge 54 to an outermost position ready for the in-feed of another I-joist 42, 44, or other. In the alternative, although not shown, it is contemplated that adhesive 58 could be applied first to the release liner 56, and the combined adhesive 58 and release liner 56 pressed against the top 46 of an I-joist 42, 44, or other so that the adhesive 58 is protected between release liner 56 and the top 46 of the I-joist 42, 44, or other.

The combined saw system 2 and present invention improvement 4 must be located in an area where they are readily accessible for inspection, routine maintenance, and repair. At a minimum, the saw system 2 used with the present invention improvement 4 has a CPU station/controller 50, a saw/router cabinet 6, an air compressor 40, a dust collector 68, an in-feed table assembly 8, an out-feed table assembly 12, and a trolley track drive assembly 10 and associated straight edge 54. Although not limited thereto, it is preferred for the combined saw system 2 and present invention improvement 4 to exceed 130 feet in length and maintain a working height of approximately three feet.

I claim:

1. An improvement to a saw system used for converting raw I-joists with opposed flanges from inventory to pre-cut sizes and cutting routed patterns therein for utility pass-through applications, the saw system having an in-feed table assembly, an out-feed table assembly, a trolley track drive assembly with straight edge positioned between the in-feed table assembly and the out-feed table assembly, means for cutting I-joists associated with the trolley track drive assembly, and a saw system controller, with said saw system improvement applying an adhesive layer and protective release liner to one of the I-joist's flanges, whereby I-joists so enhanced achieve a more consistent bond with adjacent sheer panels in residential and commercial construction for enhanced bond strength and a very low cost when compared to the cost of adhesives applied manually on the jobsite, said saw system improvement comprising:

a floor-mounted base frame in the form of at least one support table positioned between the in-feed table assembly of the associated saw system and its out-feed table assembly, said at least one support table having a top surface configured for travel thereon of I-joists moving from the in-feed table assembly to the out-feed table assembly of the associated saw system, said at least one support table also having a straight edge associated with it that is aligned with the straight edge of the saw system's trolley track drive assembly, said at least one support table straight edge also having friction-reducing means associated therewith adapted for torque requirement reduction during movement of an I-joist across said at least one support table;

an adhesive system controller in electronic communication with the saw system controller, said adhesive system controller configured for accepting patterns from the saw system controller, configured for initiating movement of an I-joist across said surface of said at least one support table and toward said support table's friction-reduced straight edge so that one I-joist flange comes into contact with said friction-reduced straight edge and the opposing I-joist flange is positioned to present an exposed I-joist surface for adhesive and release liner application, with said adhesive system controller also configured for directing adhesive and release liner applications;

an angled wheel repeatedly movable between a resting position and an operative position obliquely engaging the top of an I-joist flange and holding the opposing flange of the same I-joist against said friction-reduced straight edge of said at least one support table while adhesive and release liner applications occur;

at least one glue head adapted and positioned for depositing adhesive substance according to instruction from said adhesive system controller onto the exposed flange surface of an I-joist traveling across said at least one support table;

release liner application apparatus configured and positioned for placing a protective release liner over said adhesive substance applied by said at least one glue head to an exposed I-joist flange surface, said release liner application apparatus also having pressure application means adapted for applying pressure against said protective release liner to form the desired thickness dimension of said previously-applied adhesive substance, and a floating sub-base guided in its movement by wheels and at least one rail, said floating sub-base having an adjustable base structure that is manually adjustable to go up and down according to I-joist flange width, said floating sub-base also supporting said at least one glue head and said release liner application apparatus, wherein when an I-joist travels across said at least one support table, said angled wheel moves into said engaged position against the top of the I-joist flange to hold the opposing flange of the I-joist against said straight edge of said at least one support table, and said floating sub-base moves toward the exposed I-joist flange surface for application of protective release liner by said release liner application apparatus over and an adhesive substance to the exposed I-joist flange surface, and while said release liner application apparatus also applied pressure to the applied adhesive substance to form it into a desired thickness dimension.

2. The improvement of claim 1 wherein said friction-reducing means associated with said straight edge of said at least one support table comprises polyethylene material.

3. The improvement of claim 1 wherein said at least one angled wheel is positioned to contact an I-joist moving across said at least one support table after application of adhesive means to the I-joist by said at least one glue head.

4. The improvement of claim 3 further comprising at least one flange face guide wheel associated with said at least one support table in a position to contact an I-joist moving across said at least one support table prior to application of an adhesive substance to the exposed I-joist surface by said at least one glue head, said flange face guide wheel configured and positioned to push the I-joist against the straight edge of said at least one support table.

5. The improvement of claim 4 wherein movement of said flange face guide wheel according to the size of the I-joist is via pneumatic operation.

6. The improvement of claim 1 wherein said release liner application apparatus comprises a liner cutter and a liner applicator each positioned less than one-inch distance from the other on said floating sub-base.

7. The improvement of claim 1 wherein said friction and torque requirement reducing means is selected from a group consisting of low friction backing material, guide wheels, and roller bearings.

8. The improvement of claim 1 further comprising drive means independent from that of the saw system adapted for moving I-joists across said at least one support table.

9. The improvement of claim 1 further comprising at least one drum melter and pump, and at least one heated hose, said drum melter and pump being in fluid communication with sail at least one glue head, said at least one drum melter and pump also being adapted and positioned for providing adhesive substance to said at least one glue head, and further wherein said fluid communication between said drum melter and said at least one glue head is accomplished using said at least one heated hose.

10. The improvement of claim 1 wherein said release liner application apparatus further comprises a liner unwinder positioned above said at least one support table, and at least one liner cutter and a liner applicator associated with said floating sub-base.

11. The improvement of claim 1 further comprising features selected from a group consisting of at least one cleaning brush assembly adapted and positioned for sweeping the I-joist flange facing said at least one glue head free of dust immediately prior to application of said adhesive means by said glue head, at least one cooler adapted for cooling said adhesive substance prior to application of said release liner by said release liner application apparatus, a line applicator having a configuration and positioning that allows temporary rotation ninety degrees, at least one leading edge control sensor adapted and positioned to detect the lead edge of an I joist, and at least one trailing edge sensor positioned and adapted to instruct said controller that there is no longer an I-joist moving across said at least one support table.

12. The improvement of claim 1 further comprising at least two glue heads and wherein each of said glue heads are independently adjustable according to I-joist height and flange width.

13. A method for using the saw system improvement of claim 1 with a saw system configured for converting raw I-joists from inventory to pre-cut sizes and cutting routed patterns for utility pass-through applications, so that an adhesive substance can be added to one of the opposing flanges of the I-joist and a protective liner added over the adhesive substance to attain a more consistent bond between I-joists and adjacent sheer panels and thereby achieve maximum strength in the parts of residential and commercial construction in which they are used for a very low cost when compared to the cost of adhesives applied manually on the jobsite, said method comprising the steps of:

providing a saw system with a transfer line adapted for converting raw I-joists from inventory to pre-cut sizes and cutting routed patterns for utility pass-through applications and having a saw system controller, a drive system assembly with straight edge, I-joist cutting means an in-feed table assembly, and an out-feed table assembly;

also providing said saw system improvement of claim 1, at least one adhesive substance, and a quantity of release liner;

said adhesive system controller accepting I-joist cut patterns from said saw system controller;

said drive means of said saw system causing movement of raw I-joists across said at least one support table;

said angled wheel moving from said resting position into said operative position to obliquely engage the top of an I-joist flange and hold the opposing flange of the same I-joist against said friction-reduced straight edge of said at least one support table while adhesive and release liner applications occur;

said floating sub-base guided in its movement by wheels and at least one rail, moving up and down via manual adjustment according to I-joist flange width;

said at least one glue head extruding adhesive substance onto the one flange of said I-joist not in contact with said friction-reduced straight edge;

said release liner application apparatus placing protective liner over said applied adhesive-substance; and said release liner application apparatus also applying pressure against said release liner to form the desired thickness dimension of said adhesive substance.

14. The method of claim 13 further comprising the step of providing at least one pneumatically operated flange face guide wheel adapted and configured to push said I-joist against said straight edge of said at least one support table, and the step of associating said at least one flange face guide wheel with said at least one support table so as to contact an I-joist moving across said at least one support table prior to application of adhesive substance to the I-joist by said at least one glue head.

15. The method of claim 14 further comprising the steps of providing at least one angled wheel and associating said at least one angled wheel with said at least one support table so as to maintain the one of said I-joist flanges not receiving said adhesive substance against said drive assembly straight edge.

16. The method of claim 15 further comprising the step of providing friction and torque requirement reducing means adapted to reduce friction and torque requirements of said saw system drive means, and the step of integrating said friction and torque requirement reducing means into said straight edge of said at least one support table in a position opposed to said at least one guide wheel and said at least one angled wheel.

17. The method of claim 13 further comprising drive means associated with said at least one support table.

18. The method of claim 13 wherein said release liner application apparatus comprises a liner unwinder positioned above said at least one support table and containing a quantity of release liner, and at least one liner cutter and a liner applicator associated with said at least one support table.

19. The method of claim 13 further comprising the step of providing at least one cleaning brush assembly adapted for sweeping the I-joist flange facing said at least one glue head free of dust, and the step of positioning said cleaning brush assembly immediately prior to said glue heads, and also comprising the steps of providing and using features selected from a group consisting of at least one floating sub-base adapted for movement away from and toward said straight edge, at least one base that is manually adjustable base to go up and down according to I-joist flange width, a liner applicator having a configuration and positioning that allows temporary rotation ninety degrees, at least one cooler adapted for cooling said adhesive means prior to application of said release liner by said release liner application apparatus, at least one leading edge control sensor adapted and positioned to detect the lead edge of an I-joist, and at least one trailing edge sensor positioned and adapted to instruct said controller that there is no longer an I-joist moving across said at least one support table.

20. The method of claim 13 wherein step of positioning said support table is selected from a group consisting of a step of positioning said at least one support table prior to said cutting means of said saw system, and a step of positioning said at least one support table after said cutting means of said saw system.

\* \* \* \* \*